(12) United States Patent
Jeong et al.

(10) Patent No.: US 12,256,270 B2
(45) Date of Patent: Mar. 18, 2025

(54) VEHICULAR MOBILITY MANAGEMENT FOR IP-BASED VEHICULAR NETWORKS

(71) Applicant: RESEARCH & BUSINESS FOUNDATION SUNGKYUNKWAN UNIVERSITY, Suwon-si (KR)

(72) Inventors: Jaehoon Jeong, Busan (KR); Yiwen Shen, Suwon-si (KR); Zhong Xiang, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 610 days.

(21) Appl. No.: 17/087,930

(22) Filed: Nov. 3, 2020

(65) Prior Publication Data

US 2021/0144591 A1    May 13, 2021

(30) Foreign Application Priority Data

Nov. 4, 2019    (KR) .................. 10-2019-0139809

(51) Int. Cl.
*H04W 36/00*      (2009.01)
*H04W 4/40*      (2018.01)
(Continued)

(52) U.S. Cl.
CPC ......... *H04W 36/0009* (2018.08); *H04W 4/40* (2018.02); *H04W 36/12* (2013.01);
(Continued)

(58) Field of Classification Search
CPC ... H04W 36/0009; H04W 4/40; H04W 36/12; H04W 36/22; H04W 84/18; H04W 36/03;
(Continued)

(56) References Cited

U.S. PATENT DOCUMENTS

| 7,366,524 B2* | 4/2008 | Watanabe | H04W 68/04 455/433 |
| 7,974,269 B2* | 7/2011 | Takeda | H04W 92/02 370/328 |

(Continued)

FOREIGN PATENT DOCUMENTS

| EP | 1833204 A1 * | 9/2007 | ........ H04W 36/0011 |
| EP | 1841184 A1 * | 10/2007 | ....... H04L 29/12216 |

(Continued)

OTHER PUBLICATIONS

T. Bellache, S. Kallel, O. Shagdar and S. Tohme, "GeoMIP: A novel mobility management solution for Internet and VANET communication using geographic partition in mobile IP," 2018 Wireless Days (WD), Dubai, United Arab Emirates, 2018, pp. 21-27, doi: 10.1109/WD.2018.8361687. (Year: 2018).*

(Continued)

Primary Examiner — Yuwen Pan
Assistant Examiner — Swati Jain
(74) Attorney, Agent, or Firm — NSIP Law

(57) ABSTRACT

The present disclosure provides a method for performing a handoff by a vehicle in an IP-based vehicular network, the method including: transmitting a first router solicitation (RS) message to a first road-side unit (RSU) to access the vehicular network, the first RS message including mobility information of the vehicle; and receiving a first router advertisement (RA) message from the first RSU as a response to the first RS message, the first RA message including a first prefix of the first RSU for configuring an address of the vehicle, wherein the vehicle performs a first address registration procedure based on the first prefix.

20 Claims, 7 Drawing Sheets

(51) Int. Cl.
*H04W 36/12* (2009.01)
*H04W 36/22* (2009.01)
*H04W 36/32* (2009.01)
*H04W 84/18* (2009.01)

(52) U.S. Cl.
CPC ........... *H04W 36/22* (2013.01); *H04W 84/18* (2013.01); *H04W 36/037* (2023.05); *H04W 36/324* (2023.05)

(58) Field of Classification Search
CPC ............. H04W 36/32; H04W 36/0016; H04W 36/037; H04W 36/324; H04L 2101/659; H04L 2101/668; H04L 61/5092
See application file for complete search history.

(56) References Cited

U.S. PATENT DOCUMENTS

| | | | | |
|---|---|---|---|---|
| 8,457,143 | B2* | 6/2013 | Oh | H04W 8/26 370/409 |
| 8,755,364 | B2* | 6/2014 | Mongazon-Cazavet | H04W 80/04 370/351 |
| 8,880,705 | B2* | 11/2014 | Cherian | H04W 80/045 709/227 |
| 9,210,735 | B2* | 12/2015 | Sarikaya | H04L 61/2553 |
| 9,226,153 | B2* | 12/2015 | Gaspar | H04W 12/06 |
| 10,447,579 | B2* | 10/2019 | Gundavelli | H04L 45/22 |
| 2005/0088994 | A1* | 4/2005 | Maenpaa | H04W 60/00 370/331 |
| 2005/0117560 | A1* | 6/2005 | Thubert | H04W 60/00 370/352 |
| 2008/0207206 | A1* | 8/2008 | Taniuchi | H04W 12/062 455/436 |
| 2009/0097453 | A1* | 4/2009 | Weniger | H04W 8/087 370/331 |
| 2009/0219832 | A1* | 9/2009 | Velev | H04W 36/0011 370/254 |
| 2011/0013586 | A1* | 1/2011 | Oh | H04W 8/26 370/331 |
| 2011/0103340 | A1* | 5/2011 | Zhu | H04W 36/0019 370/329 |
| 2011/0110286 | A1* | 5/2011 | Lu | H04L 12/185 370/312 |
| 2013/0301584 | A1* | 11/2013 | Addepalli | H04W 72/53 370/329 |
| 2013/0324125 | A1* | 12/2013 | Bachmann | H04W 36/1446 455/436 |
| 2019/0394833 | A1* | 12/2019 | Talebi Fard | H04W 68/005 |
| 2020/0228948 | A1* | 7/2020 | Watfa | H04W 48/14 |
| 2020/0336348 | A1* | 10/2020 | Razavi | H04B 17/336 |
| 2022/0109633 | A1* | 4/2022 | Li | H04L 61/58 |
| 2022/0178705 | A1* | 6/2022 | Tarkiainen | G01C 21/3407 |
| 2024/0259857 | A1* | 8/2024 | Zhu | H04W 76/11 |

FOREIGN PATENT DOCUMENTS

| | | | | |
|---|---|---|---|---|
| EP | 2174480 | B1 * | 9/2016 | ........... H04L 12/189 |
| KR | 100853181 | B1 * | 8/2008 | |
| WO | WO-2007110128 | A1 * | 10/2007 | ....... H04L 29/12216 |
| WO | WO-2013016189 | A1 * | 1/2013 | .............. H04W 4/06 |
| WO | WO-2017052683 | A1 * | 3/2017 | ...... H04W 36/00837 |
| WO | WO-2017176329 | A1 * | 10/2017 | .......... H04W 28/085 |
| WO | WO-2020198345 | A1 * | 10/2020 | ........... H04B 17/318 |
| WO | WO-2021055368 | A1 * | 3/2021 | ............... H04B 7/15 |

OTHER PUBLICATIONS

S. Cespedes, X. Shen and C. Lazo, "IP mobility management for vehicular communication networks: challenges and solutions," in IEEE Communications Magazine, vol. 49, No. 5, pp. 187-194, May 2011, doi: 10.1109/MCOM.2011.5762817. (Year: 2011).*

L. Banda, M. Mzyece and G. Noel, "IP Mobility Support: Solutions for Vehicular Networks," in IEEE Vehicular Technology Magazine, vol. 7, No. 4, pp. 77-87, Dec. 2012, doi: 10.1109/MVT.2012.2203881. (Year: 2012).*

Ali Safa Sadiq, Norsheila Binti Fisal, Kayhan Zrar Ghafoor, Jaime Lloret, "Advanced Mobility Handover for Mobile IPV6 Based Wireless Networks", The Scientific World Journal, vol. 2014, Article ID 602808, 20 pages, 2014. https://doi.org/10.1155/2014/602808 (Year: 2014).*

Ravi Shankar Shukla, Neeraj Tyagi, International Journal of Next-Generation Networks (IJNGN) vol. 5, No. 3, Sep. 2013, pp. 23-34, DOI : 10.5121/ijngn.2013.5302 (Year: 2013).*

Ali Safa Sadiq, Norsheila Binti Fisal, Kayhan Zrar Ghafoor, Jaime Lloret, "Advanced Mobility Handover for Mobile IPV6 Based Wireless Networks", The Scientific World Journal, vol. 2014, Article ID 602808, 20 pages, 2014. https://doi.org/10.1155/2014/602808 (Year: 2014) (Year: 2014).*

T. Bellache, S. Kallel, O. Shagdar and S. Tohme, "GeoMIP: A novel mobility management solution for Internet and VANET communication using geographic partition in mobile IP," 2018 Wireless Days (WD), Dubai, United Arab Emirates, 2018, pp. 21-27, doi: 10.1109/WD.2018.8361687. (Year: 2018) (Year: 2018).*

S. Cespedes, X. Shen and C. Lazo, "IP mobility management for vehicular communication networks: challenges and solutions," in IEEE Communications Magazine, vol. 49, No. 5, pp. 187-194, May 2011, doi: 10.1109/MCOM.2011.5762817. (Year: 2011) (Year: 2011).*

L. Banda, M. Mzyece and G. Noel, "IP Mobility Support: Solutions for Vehicular Networks," in IEEE Vehicular Technology Magazine, vol. 7, No. 4, pp. 77-87, Dec. 2012, doi: 10.1109/MVT.2012.2203881. (Year: 2012) (Year: 2012).*

* cited by examiner

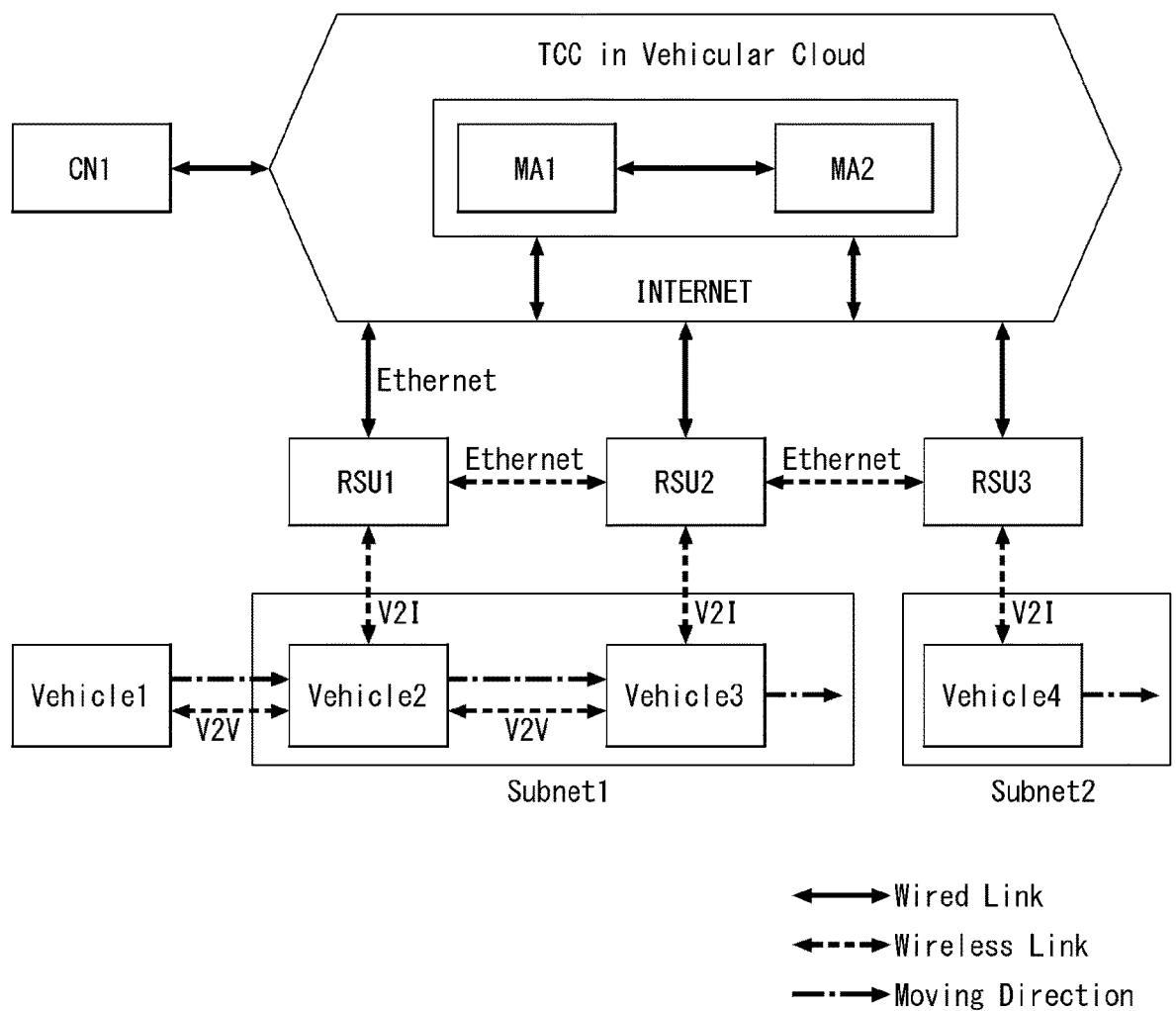
[Fig. 1]

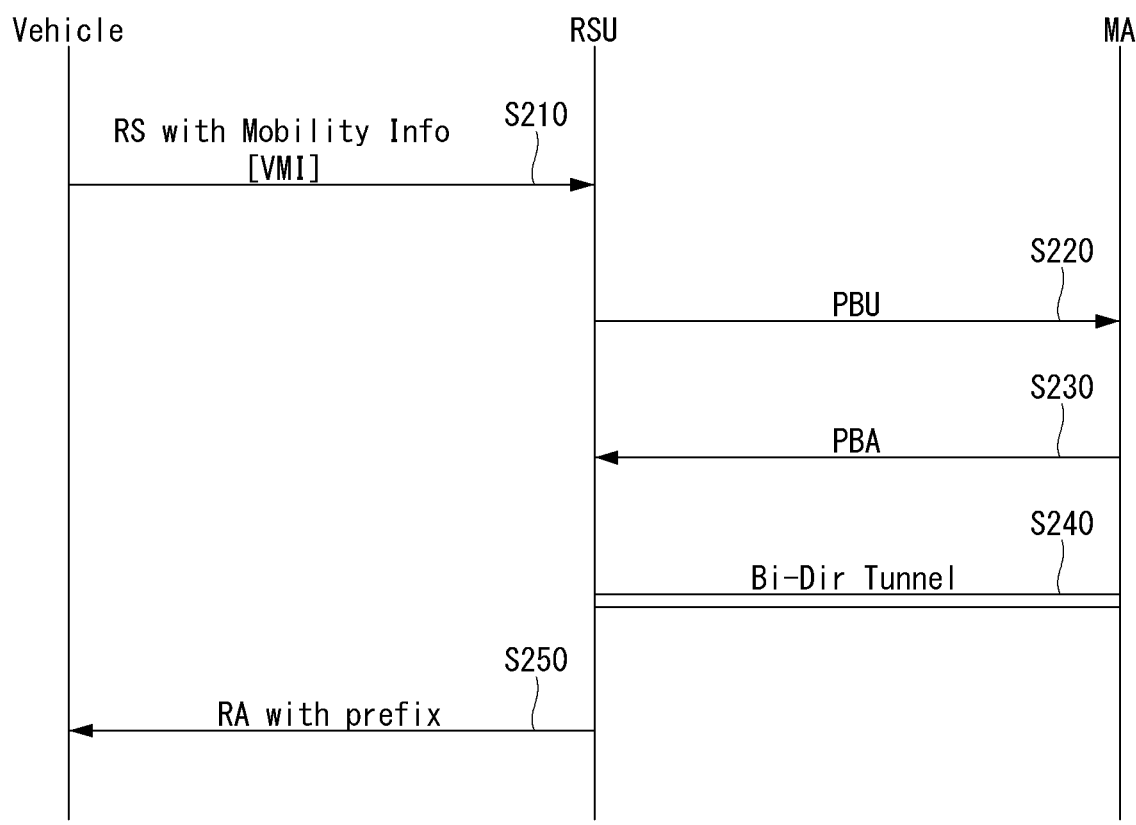

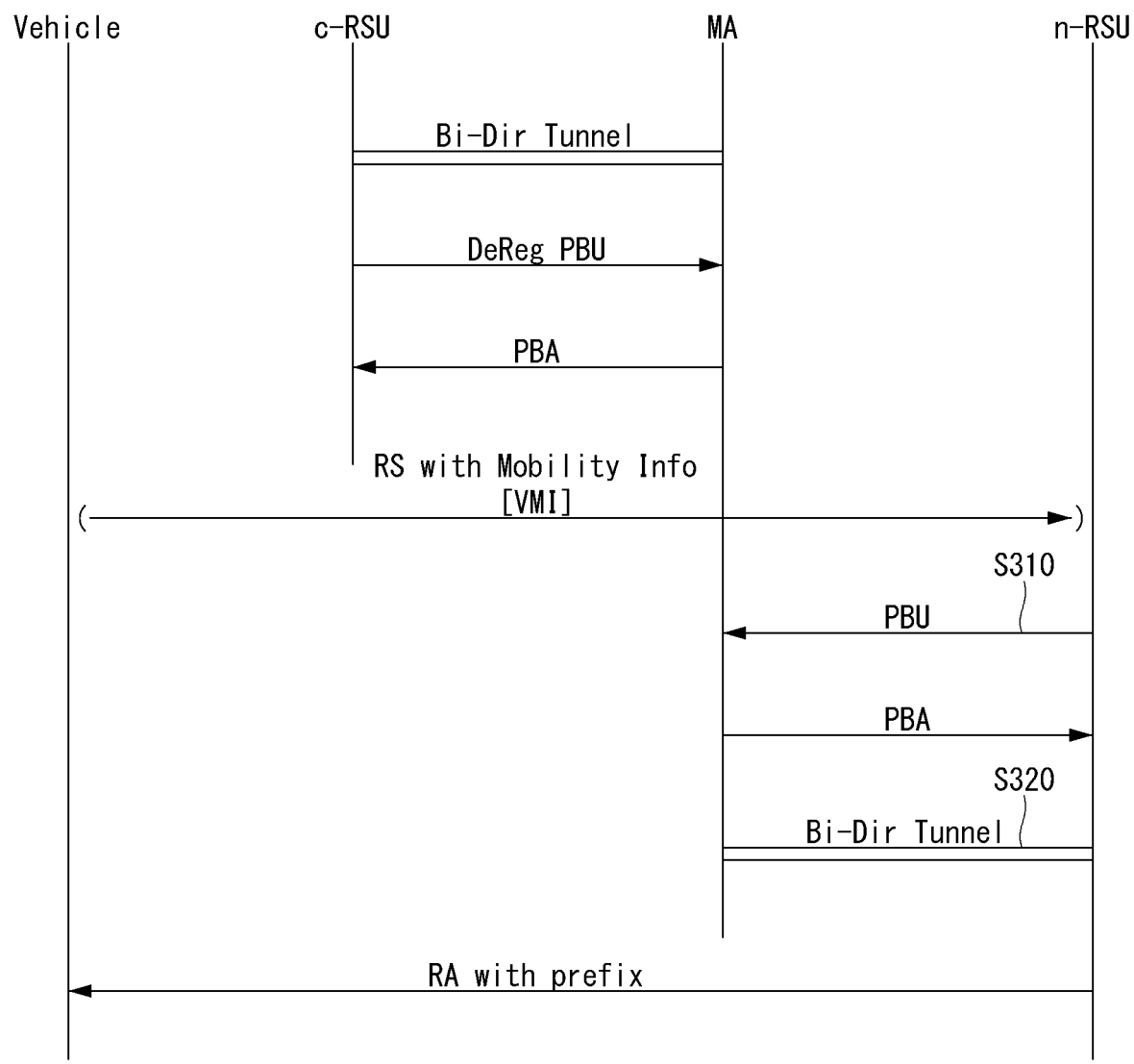
[Fig. 3]

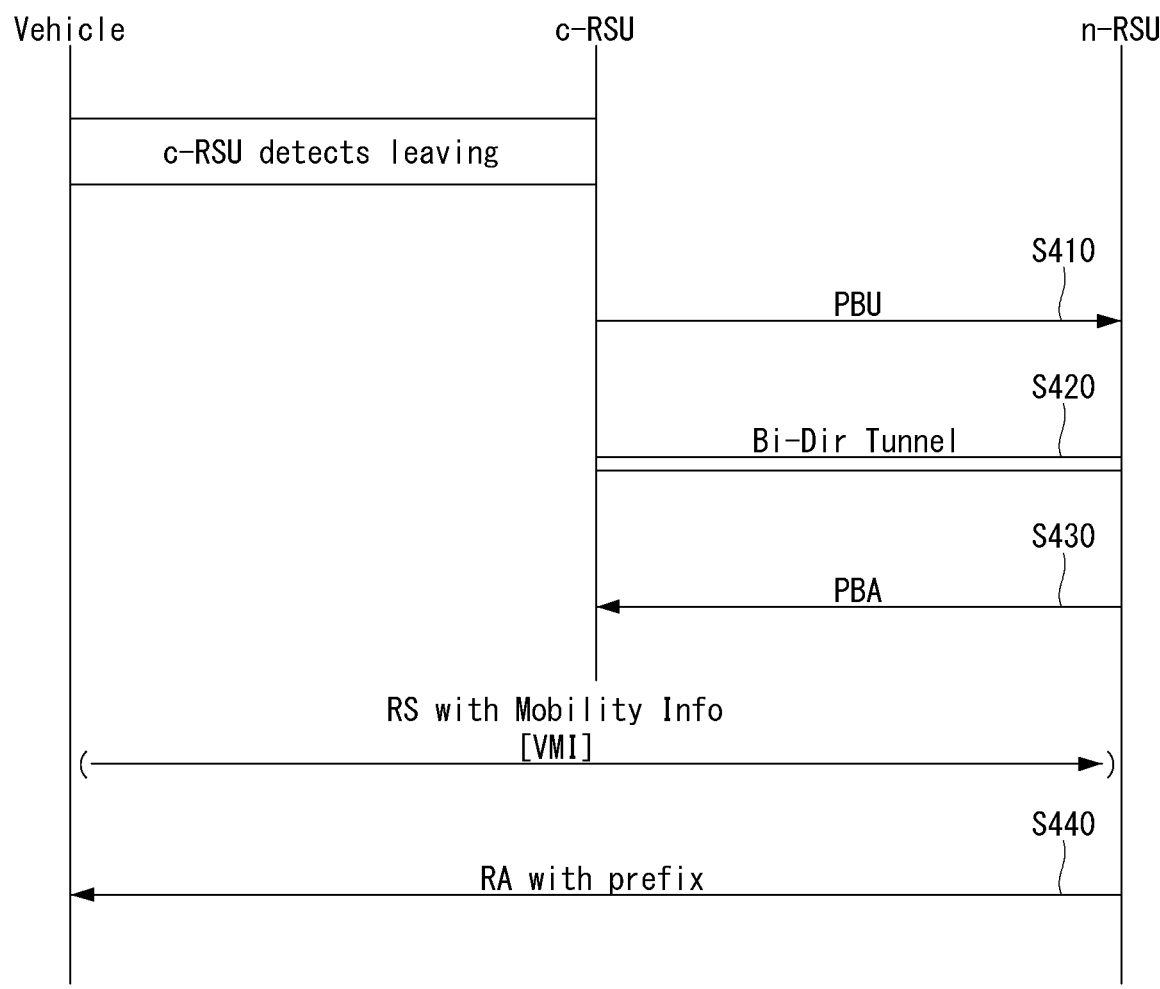

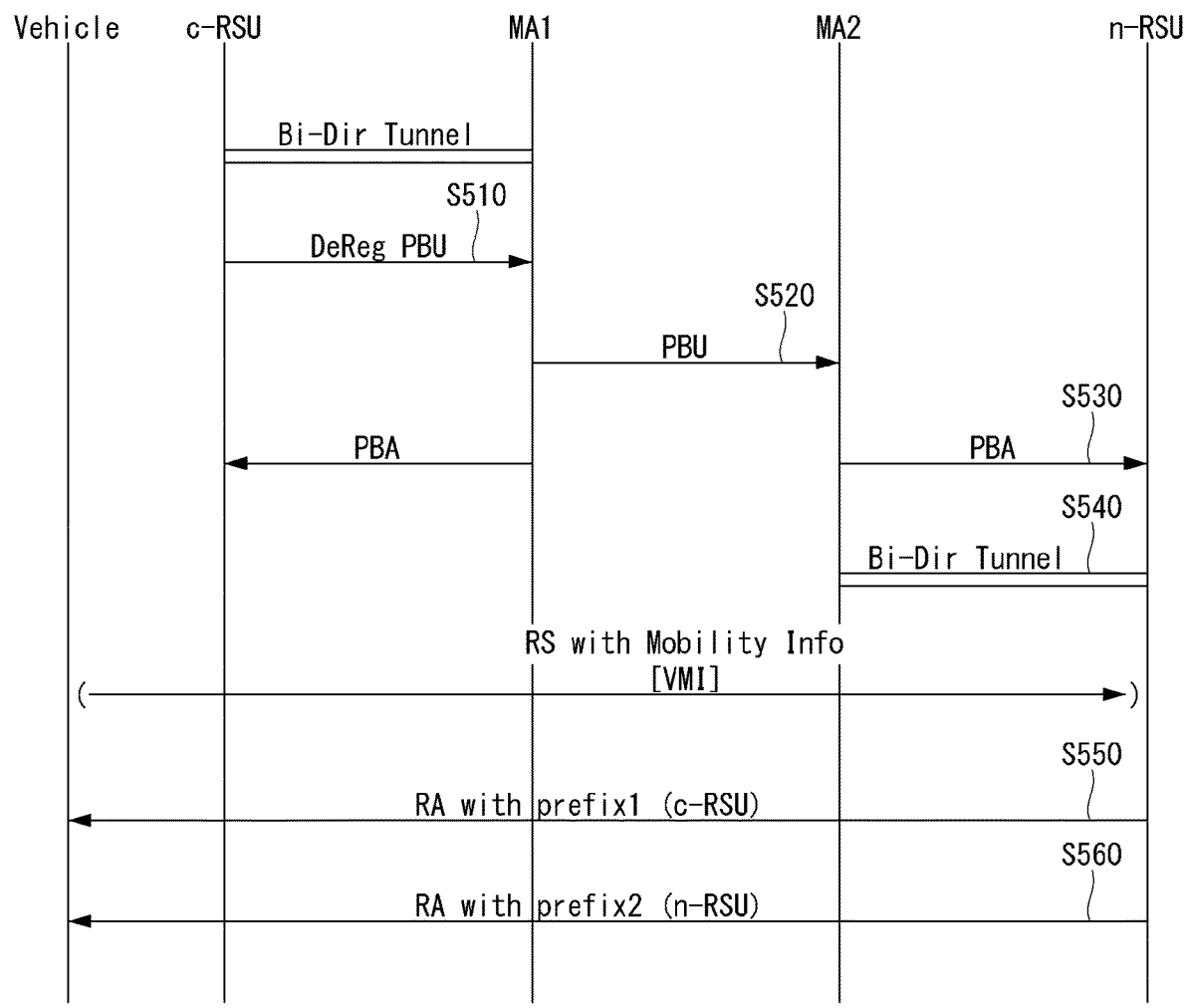
[Fig. 5]

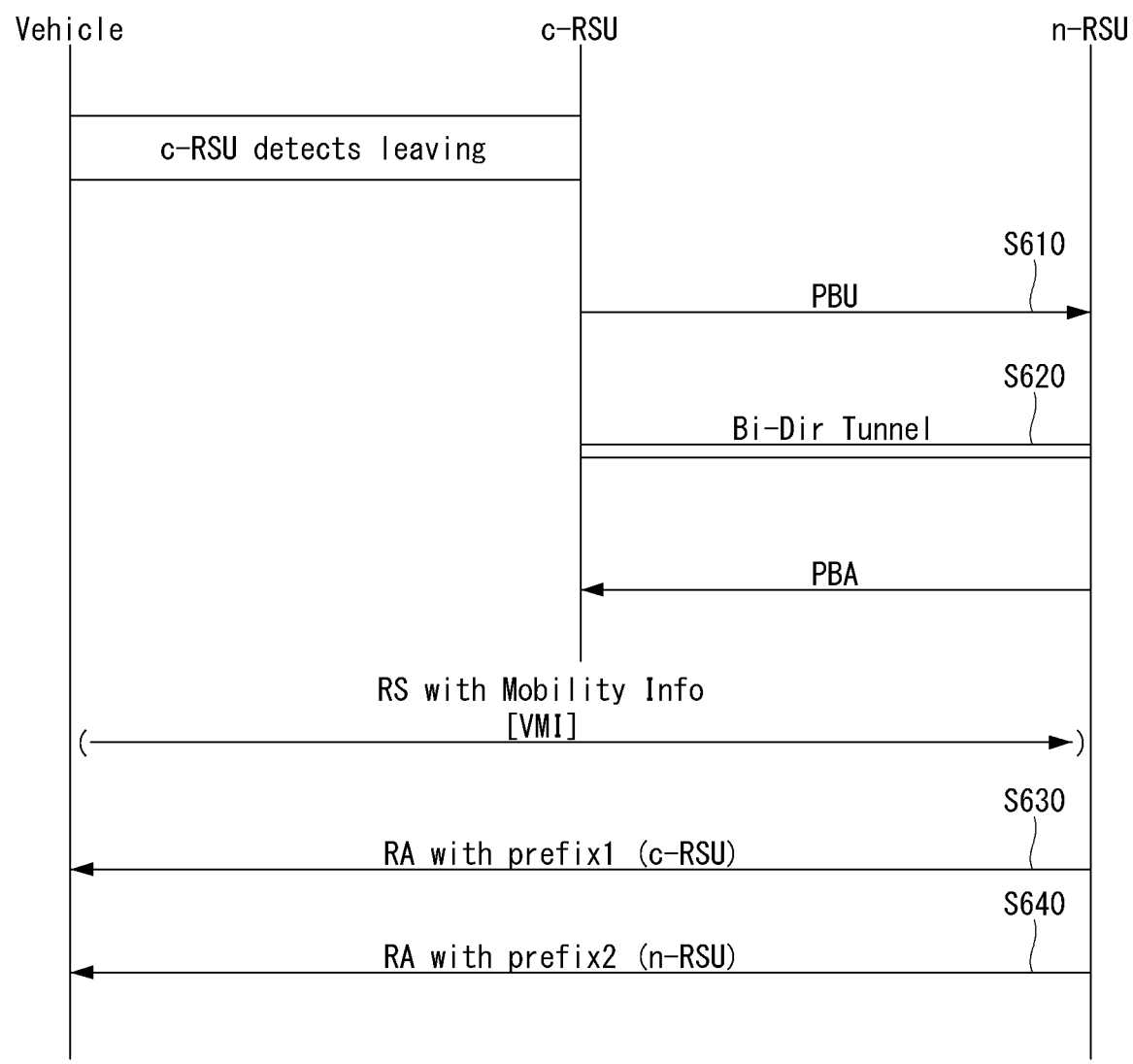
[Fig. 6]

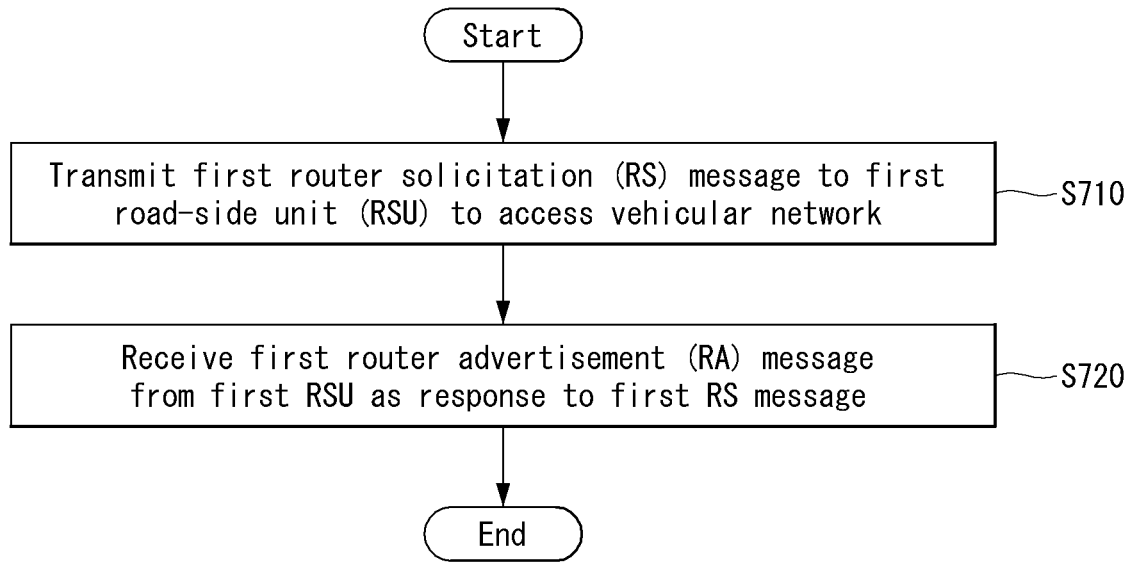
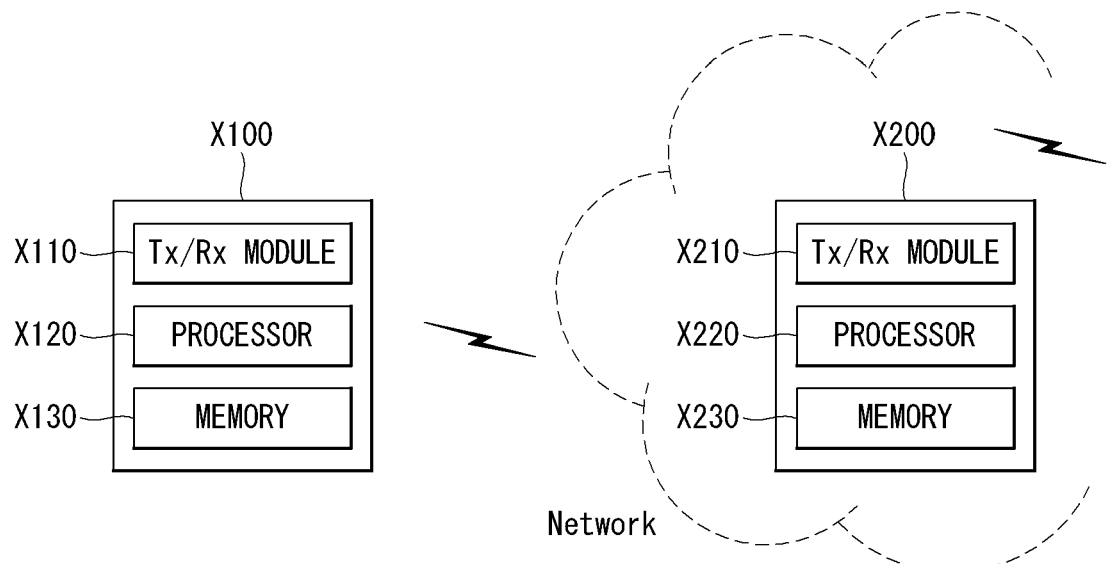

VEHICULAR MOBILITY MANAGEMENT FOR IP-BASED VEHICULAR NETWORKS

CROSS-REFERENCE TO RELATED APPLICATION

This application claims the benefit of Korean Patent Application No. 10-2019-0139809 filed on Nov. 4, 2019. The contents of this application are hereby incorporated by reference in its entirety.

BACKGROUND OF THE DISCLOSURE

Field of the Disclosure

The present disclosure relates to a vehicular mobility management method, and more specifically, to definition of a vehicular mobility management (VMM) method for IP-based vehicular networks.

Related Art

Research on vehicular Ad Hoc networks (VANET) has been conducted for intelligent transportation systems (ITS) for safe and efficient driving and entertainment. IEEE standardized IEEE 802.11-OCB (Outside the Context of a Basic Service Set) in consideration of high mobility of vehicular networks based on dedicated short-range communications (DSRC).

The Internet is operated according to TCP/IP (Transmission Control Protocol/Internet Protocol) issued by IETF (Internet Engineering Task Force) and TCP/IP can be found in RFC (Request For Comments) 703 and RFC 791 issued by IETF.

SUMMARY

An object of the present disclosure is to provide a moving vehicle with proactive and seamless handoff along with its trajectory through mobility information (e.g., position, speed, acceleration/deceleration, and direction) and navigation path of the vehicle.

Technical objects to be achieved by the present disclosure are not limited to the aforementioned technical objects, and other technical objects not described above may be evidently understood by a person having ordinary skill in the art to which the present disclosure pertains from the following description.

In an aspect of the present disclosure, a method for performing a handoff by a vehicle in an IP-based vehicular network includes: transmitting a first router solicitation (RS) message to a first road-side unit (RSU) to access the vehicular network, the first RS message including mobility information of the vehicle; and receiving a first router advertisement (RA) message from the first RSU as a response to the first RS message, the first RA message including a first prefix of the first RSU for configuring an address of the vehicle, wherein the vehicle performs an address registration procedure based on the first prefix.

Further, the mobility information of the vehicle may be delivered to a first mobility anchor (MA) of the vehicular network through the first RSU.

Further, the vehicle may be de-registered from the first RSU based on notifying, by the first RSU, the first MA that the vehicle is moving out of a coverage of the first RSU.

Further, the method may include: transmitting a second RS message to a second RSU based on entry of the vehicle into a coverage of the second RSU; and receiving a second RA message from the second RSU as a response to the second RS message.

Further, the second RA message may be signaled through a second prefix of the second RSU.

Further, the vehicle may perform the address registration procedure based on the second prefix.

Further, the second RA message may be generated based on notifying, by the first MA, a second MA that the vehicle is moving out of the coverage of the first RSU.

In another aspect of the present disclosure, a vehicle performing a handoff in an IP-based vehicular network includes: a transceiver configured to transmit/receive signals; a memory configured to store data; and a processor configured to functionally control the transceiver and the memory, wherein the processor is configured: to transmit a first router solicitation (RS) message to a first road-side unit (RSU) through the transceiver to access the vehicular network, the first RS message including mobility information of the vehicle; to receive a first router advertisement (RA) message from the first RSU as a response to the first RS message, the first RA message including a first prefix of the first RSU for configuring an address of the vehicle; and to perform an address registration procedure based on the first prefix.

BRIEF DESCRIPTION OF THE DRAWINGS

FIG. 1 illustrates a vehicular network architecture for V2I and V2V to which the present disclosure is applicable.

FIG. 2 illustrates binding update when a vehicle has entered a subnet of RSU to which the present disclosure is applicable.

FIG. 3 illustrates handoff of a vehicle within one prefix domain with PMIPv6.

FIG. 4 illustrates handoff of a vehicle within one prefix domain with DMM.

FIG. 5 illustrates handoff of a vehicle between two prefix domains with PMIPv6.

FIG. 6 illustrates handoff of a vehicle between two prefix domains with DMM.

FIG. 7 illustrates an embodiment to which the present disclosure is applicable.

FIG. 8 illustrates general devices to which the present disclosure is applicable.

The accompany drawings, which are included to provide a further understanding of the present disclosure and are incorporated on and constitute a part of this specification illustrate embodiments of the present disclosure and together with the description serve to explain the principles of the present disclosure.

DESCRIPTION OF EXEMPLARY EMBODIMENTS

Hereinafter, preferred embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Specific terms used in the following description are provided to aid in understating of the present disclosure and such specific terms may be modified to other forms without departing from the technical scope of the present disclosure.

The present disclosure proposes vehicular neighbor discovery (VND) as an enhanced IPv6 neighbor discovery (ND) for IP-based vehicular networks to support the interaction between vehicles or between vehicles and road-side units (RSUs) [ID-IPWAVE-VND]. For an efficient IPv6 stateless address autoconfiguration (SLAAC) [RFC4862], VND may adopt an optimized address registration using a multihop duplicate address detection (DAD). This multihop DAD enables a vehicle to have a unique IP address in a multi-link subnet that consists of multiple wireless subnets with the same IP prefix, which corresponds to wireless coverage of multiple RSUs. Also, VND supports IP packet routing via a connected vehicular Ad Hoc network (VANET) by letting vehicles exchange the prefixes of their internal networks through their external wireless interface.

Mobility management provides an optimized address registration and multihop DAD mechanism to vehicles. In addition, an efficient mobility management technique is designated to support efficient V2V, V2I and V2X communications. VMM takes advantage of mobility information (e.g., a speed, direction, and position of a vehicle) and trajectory (i.e., navigation path) of each vehicle registered in a traffic control center (TCC) in the vehicular cloud.

In the present disclosure, the terminology described in [RFC4861] and [RFC4862] are used. In addition, the following terms can be defined.

Distributed Mobility Management (DMM)

Mobility Anchor (MA): A node that maintains IP addresses and mobility information of vehicles in a road network to support their address autoconfiguration and mobility management with a binding table. It has end-to-end connections with RSUs under its control.

On-Board Unit (OBU): A node that has a network interface (e.g., IEEE 802.11-OCB and Cellular V2X (C-V2X) [TS-23.285-3GPP]) for wireless communications with other OBUs and RSUs, and may be connected to in-vehicle devices or networks. An OBU is mounted on a vehicle. It is assumed that a radio navigation receiver (e.g., Global Positioning System (GPS)) is included in a vehicle with an OBU for efficient navigation.

Outside the Context of a Basic Service Set (OCB): Outside context of a basic service set.

RSU: A node that has physical communication devices (e.g., DSRC, visible light communication, 802.15.4, LTE-V2X, etc.) for wireless communications with vehicles and is also connected to the Internet as a router or switch for packet forwarding. An RSU is typically deployed on the road infrastructure, either at an intersection or in a road segment, but may also be located in car parking areas.

Traffic control center (TCC): A node that maintains road infrastructure information (e.g., RSUs, traffic signals, and loop detectors), vehicular traffic statistics (e.g., average vehicle speed and vehicle inter-arrival time per road segment), and vehicle information (e.g., an identifier, position, direction, speed, and trajectory as a navigation path of a vehicle). TCC is included in a vehicular cloud.

Vehicular cloud): A cloud infrastructure for vehicular networks, having compute nodes, storage nodes, and network nodes.

WAVE: Acronym for "Wireless Access in Vehicular Environments" [WAVE-1609.0].

Vehicular Network Architecture

Hereinafter, a vehicular network architecture for V2V and V2I communication will be described. A vehicle and an RSU have their internal networks including in-vehicle devices or servers, respectively.

FIG. 1 illustrates a vehicular network architecture for V2I and V2V to which the present disclosure is applicable.

Referring to FIG. 1, three RSUs are deployed along roadways and connected to an MA through wired networks. In the vehicular network, there are two subnets such as Subnet1 and Subnet2. Subnet1 is a multi-link subnet composed of multiple wireless coverage areas, and those areas may share the same IPv6 prefix to construct a single logical subnet [D-IPWAVE-PS]. That is, the wireless links of RSU1 and RSU2 belong to Subnet1. Thus, since Vehicle2 and Vehicle3 use the same prefix for Subnet1 and they are within the wireless communication range, they can communicate directly with each other. In a multi-link subnet, a vehicle (e.g., Vehicle2 and Vehicle3 in FIG. 1) can configure its global IPv6 address through an address registration procedure including a multihop DAD.

On the other hand, Subnet2 uses a prefix different from that of Subnet1. Vehicle4 residing in Subnet2 cannot talk to Vehicle3 directly because they belong to different subnets. Vehicles can construct a connected VANET, so they can communicate with each other without the relaying of an RSU, but the forwarding over the VANET. In the case where two vehicles belong to the same multi-link subnet, but they are not connected in the same VANET, they can use RSUs. Referring to FIG. 1, even though Vehicle1 is disconnected from Vehicle3, they can communicate indirectly with each other through RSUs such as RSU1 and RSU2.

In the present disclosure, FIG. 1 illustrates a mobility management scheme in the vehicular network architecture. It is assumed that Vehicle2 communicates with the corresponding node denoted as CN1 where Vehicle2 is moving in the wireless coverage of RSU1. When Vehicle2 moves out of the coverage of RSU1 and moves into the coverage of RSU2 where RSU1 and RSU2 share the same prefix, packets sent by CN1 should be routed toward Vehicle2 via RSU2. Also, when Vehicle2 moves out of the coverage of RSU2 and moves into the coverage of RSU3 where RSU2 and RSU3 use two different prefixes, the packets of CN1 should be delivered to Vehicle2 via RSU3. With a handoff procedure, packets of a sender can be delivered to a destination vehicle which is moving in the wireless coverage areas.

Mobility Management

1. Network Attachment of Vehicle

Mobility management is required for the seamless communication of vehicles moving between RSUs. When a vehicle moves into the coverage of another RSU, a different IP address is assigned to the vehicle, resulting in the reconfiguration of transport-layer session information (i.e., an IP address of an end-point) to avoid service disruption. Considering this issue, the present disclosure proposes a handoff mechanism for seamless communication.

In addition, the present disclosure proposes a new shared-prefix model in which a mobility management system similar to PMIPv6 is used but vehicles in the same subnet share the same prefix.

FIG. 2 illustrates binding update when a vehicle has entered a subnet of an RSU to which the present disclosure is applicable.

Referring to FIG. 2, an RSU acts as a mobility anchor gateway (MAG) defined in [VIP-WAVE]. The RSU receives, from a vehicle, a router solicitation (RS) message containing mobility information (e.g., position, speed, and direction) of the vehicle (S210). The RSU sends a proxy binding update (PBU) message [RFC5213] to an MA (S220). For example, the PBU message contains a mobility option including the mobility information of the vehicle.

The MA receives the PBU and may set up a binding cache entry (BCE) as well as a bi-directional tunnel (denoted as Bi-Dir Tunnel in FIG. 2) between the serving RSU and itself.

Through this tunnel, all traffic packets to the vehicle are encapsulated toward the RSU. Simultaneously, the MA sends back a proxy binding acknowledgment (PBA) message to the serving RSU (S230). The serving RSU receives the PBA and sets up a bi-directional tunnel with the MA (S240). After binding update, the RSU sends back a router advertisement (RA) message to the vehicle (S250). For example, the RA message includes the prefix of the RSU for the address autoconfiguration of the vehicle.

When the vehicle receives the RA message, the vehicle may perform the address registration procedure including a multihop DAD for its global IP address based on the prefix announced by the RA message according to the VND [ID-IPWAVE-VND].

In PMIPv6, a unique prefix is allocated to each vehicle by an MA (i.e., LMA) to guarantee the uniqueness of each address, but in the present disclosure, a unique IP address can be allocated to each vehicle with the same prefix by an MA in its domain through the multihop-DAD-based address registration. This unique IP address allocation ensures that vehicles own unique IP addresses in a multi-link subnet and can reduce the waste of IP prefixes in legacy PMIPv6.

2. Handoff within One Prefix Domain

When a vehicle changes its location and its current RSU (c-RSU) detects that the vehicle is moving out of its coverage, the c-RSU needs to report the leaving of the vehicle to the MA and de-register the binding via PBU.

In the present disclosure, the MA will send back a PBA to notice the de-register to c-RSU, and get ready to detect new binding requests. If the MA can figure out a new RSU (n-RSU) based on a trajectory of the vehicle, the MA may directly change the end-point of the tunnel to the IP address of the n-RSU for the vehicle.

FIG. 3 illustrates the handoff of a vehicle within one prefix domain (i.e., a multi-link subnet) with PMIPv6. Referring to FIG. 3, when the MA receives a new PBU from the n-RSU, the MA changes the end-point of the tunnel from the c-RSU to the n-RSU (S320). If there are ongoing IP packets toward the vehicle, the MA encapsulates the packets and then forwards them towards the n-RSU. Through this network-based mobility management, the vehicle is not aware of any changes at its network layer and can maintain its transport-layer sessions without any disruption.

If the c-RSU and the n-RSU are adjacent, that is, vehicles are moving in specified routes with fixed RSU allocation, the procedure can be simplified by constructing the bidirectional tunnel directly between them (cancel the intervention of the MA) to alleviate the traffic flow in the MA as well as reduce handoff delay.

FIG. 4 illustrates the handoff of a vehicle within one prefix domain (as a multi-link subnet) with DMM [ID-DMM-PMIPv6]. RSUs are in charge of detecting when a node joins or moves through their domains. If the c-RSU detects that the vehicle is going to leave its coverage and to enter the area of an adjacent RSU, the c-RSU sends a PBU message to inform the n-RSU of the handoff of the vehicle (S410). If the n-RSU receives the PBU message, the n-RSU constructs a bidirectional tunnel between the c-RSU and itself (S420), and then sends back a PBA message as an acknowledgment to the c-RSU (S430).

If there are ongoing IP packets toward the vehicle, the c-RSU encapsulates the packets and then forwards them to the n-RSU.

When the n-RSU detects the entrance of the vehicle, the n-RSU directly sends an RA message to the vehicle so that the vehicle can assure that it is still connected to a router with its current prefix. If the vehicle sends an RS message to the n-RSU, the n-RSU responds to the RS message by replying an RA to the vehicle (S440).

3. Handoff Between Multiple Prefix Domains

When a vehicle moves from a prefix domain to another prefix domain, a handoff between multiple prefix domains is required.

Referring to FIG. 1, when Vehicle3 moves from the subnet of RSU2 (i.e., Subnet1) to the subnet of RSU3 (i.e., Subnet2), a multiple domain handoff may be performed through the cooperation of RSU2, RSU3, MA1 and MA2.

FIG. 5 illustrates the handoff of a vehicle between two prefix domains (i.e., two multi-link subnets) with PMIPv6.

Referring to FIG. 5, when the vehicle moves out of the c-RSU belonging to Subnet1 and moves into the n-RSU belonging to Subnet2, the c-RSU detects the leaving of the vehicle and reports it to MA1 (S510). MA1 determines that the vehicle will get into the coverage of the n-RSU based on the trajectory of the vehicle and sends a PBU message to MA2 to inform MA2 that the vehicle will enter the coverage of the n-RSU (S520). MA2 sends a PBA message to the n-RSU to inform the n-RSU that the vehicle will enter the coverage of the n-RSU along with context information of the c-RSU (e.g., the link-local address of the c-RSU and prefix1), and context information of the vehicle (e.g., the global IP address and MAC address of the vehicle) (S530).

After the n-RSU receives the PBA message including the handoff context from MA2, the n-RSU sets up a bi-directional tunnel with MA2 (S540) and generates an RA message with the context information of the c-RSU. That is, the n-RSU may pretend to be a router belonging to Subnet1.

When the vehicle receives RA from the n-RSU (S550), the vehicle can maintain its connection with its corresponding node (i.e., CN1). The n-RSU can also send the RA message with its domain prefix called prefix2 (S560). Accordingly, the vehicle configures another global IP address with prefix2 and can use it for communication with neighboring vehicles under the coverage of the n-RSU.

If the c-RSU and the n-RSU are adjacent, that is, vehicles are moving in specified routes with fixed RSU allocation, the procedure can be simplified by constructing the bidirectional tunnel directly between them (cancel the intervention of MAs) to alleviate the traffic flow in MA as well as reduce handoff delay.

FIG. 6 illustrates the handoff of a vehicle within two prefix domains with DMM.

Referring to FIG. 6, if the c-RSU detects that the vehicle is going to leave its coverage and to enter the area of an adjacent RSU (n-RSU) belonging to a different prefix domain, the c-RSU sends a PBU message to inform the n-RSU that the vehicle will enter the coverage of the n-RSU along with handoff context such as context information of the c-RSU (e.g., the link-local address of the c-RSU and prefix called prefix1) and context information of the vehicle (e.g., the global IP address and MAC address of the vehicle) (S610).

After the n-RSU receives the PBA message including the handoff context from the c-RSU (S620), the n-RSU sets up a bi-directional tunnel with the c-RSU and generates RA messages with the context information of the c-RSU. That is, the n-RSU may pretend to be a router belonging to Subnet1. When the vehicle receives RA from the n-RSU (S630), the vehicle can maintain its connection with its corresponding node (i.e., CN1). The n-RSU also sends RA messages with its domain prefix called prefix2 (S640). The vehicle configures another global IP address with prefix2 and can use it for communication with neighboring vehicles under the coverage of the n-RSU.

FIG. 7 illustrates an embodiment to which the present disclosure is applicable.

Referring to FIG. 7, the above-described method in which a vehicle performs handoff in an IP-based vehicular network will be described in more detail. A first road-side unit (RSU) may refer to a c-RSU and a second RSU may refer to an n-RSU. When the first RSU and the second RSU use different prefixes, a first mobility anchor (MA) may manage vehicular mobility through the first RSU and a second MA may manage vehicular mobility through the second RSU.

To access the vehicular network, the vehicle sends a first router solicitation (RS) message to the first RSU (S710). For example, the first RS message includes mobility information of the vehicle. The mobility information of the vehicle can be delivered to the first NA of the vehicular network through the first RSU.

The vehicle receives a first router advertisement (RA) message from the first RSU as a response to the first RS message (S720). For example, the first RA message includes a first prefix of the first RSU for configuring the address of the vehicle. The vehicle can perform the address registration procedure on the basis of the received first prefix.

When the first RSU notifies the first MA that the vehicle is moving out of the coverage of the first RSU, the vehicle can be de-registered from the first RSU.

Further, when the vehicle moves to enter the coverage of the second RSU, the vehicle may send a second RS message to the second RSU and receive a second RA message from the second RSU as a response to the second RS message. For example, the second RA can be generated by the second RSU upon the vehicle's entering the coverage of the second RSU.

Here, the second RA message may be signaled through a second prefix of the second RSU. Upon reception of the second prefix, the vehicle can perform another address registration procedure based on the second prefix.

General Devices to which Present Disclosure is Applicable

FIG. 8 illustrates general devices to which the present disclosure is applicable.

Referring to FIG. 8, a server X200 according to a proposed embodiment may be a multi-access edge computing (MEC) server or a cloud server, or a vehicular server, and include a communication module X210, a processor X220 and a memory X230. The communication module X210 is also referred to as a radio frequency (RF) unit. The communication module X210 may be configured to transmit various signals, data and information to external devices and to receive various signals, data and information from external devices. The server X200 may be connected to external devices in a wired and/or wireless manner. The communication module X210 may be implemented as a separate transmitter and receiver. The processor X220 can control the overall operation of the server X200 and may be configured to execute functions of processing information to be transmitted/received by the server X200 to/from external devices. Further, the processor X220 may be configured to perform server operations proposed in the present disclosure. The processor X220 may control the communication module X210 such that the communication module X210 transmits data or messages to user equipment (UE), other vehicles or other servers according to proposition of the present disclosure. The memory X230 may store processed information and the like for a predetermined time and may be substituted with a component such as a buffer. The server X200 may include the aforementioned RSUs and MAs.

In addition, specific configurations of the above-described terminal device X100 and server X200 may be implemented such that the above-described various embodiments of the present disclosure can be independently applied or two or more embodiments can be simultaneously applied, and redundant description is omitted for clarity.

Embodiments described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

The embodiments of the present disclosure may be implemented by various means, for example, hardware, firmware, software, or a combination thereof. If the embodiments of the present disclosure are implemented by hardware, an embodiment of the present disclosure may be implemented by application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, or the like.

In the case of implementation by firmware or software, an embodiment of the present disclosure may be implemented in the form of a module, a procedure or a function for executing functions or operations described above. Software code may be stored in a memory and executed by a processor. The memory is located inside or outside the processor and may exchange data with the processor through various known means.

Those skilled in the art will appreciate that the present disclosure may be carried out in other specific ways than those set forth herein without departing from the spirit and essential characteristics of the present invention. The above embodiments are therefore to be construed in all aspects as illustrative and not restrictive. The scope of the present disclosure should be determined by the appended claims and their legal equivalents, not by the above description, and all changes coming within the meaning and equivalency range of the appended claims are intended to be embraced therein.

The present disclosure can be applied to various vehicular network systems.

According to the present disclosure, it is possible to provide a moving vehicle with proactive and seamless handoff along with its trajectory through mobility information and a navigation path of the vehicle.

Effects which may be obtained by the present disclosure are not limited to the aforementioned effects, and other technical effects not described above may be evidently understood by a person having ordinary skill in the art to which the present disclosure pertains from the following description.

What is claimed is:

1. A method for performing a handoff by a vehicle in an IP-based vehicular network, the method comprising:
    transmitting, by the vehicle, a first router solicitation (RS) message to a road-side unit (RSU) to connect with the vehicular network, the RS message including mobility information of the vehicle;
    transmitting, by the RSU to its mobility anchor (MA), a Proxy Binding Update (PBU) message, which includes the mobility information of the vehicle;
    transmitting, by the MA, a proxy binding acknowledgement (PBA) message to the RSU in response to the PBU message;
    allocating, by the MA, a unique IP address to each of a plurality of vehicles in the IP-based vehicular network with a same prefix in its domain;
    generating a Bi-Directional (Bi-Dir) Tunnel between the RSU and the MA based on the PBU message, wherein all traffic packets sent to the vehicle are encapsulated toward the RSU through the Bi-Dir Tunnel;
    receiving a router advertisement (RA) message from the RSU in response to the transmission of the RS message, the RA message including the prefix of the RSU for configuring an address of the vehicle; and
    performing a first address registration procedure based on the first prefix.

2. The method of claim 1, wherein the mobility information of the vehicle is delivered to the mobility anchor (MA) of the vehicular network through first RSU.

3. The method of claim 2, wherein the vehicle is de-registered from the RSU based on a report, by the RSU, to the MA that the vehicle is leaving a coverage area of the RSU.

4. The method of claim 3, further comprising:
    transmitting another RS message to another RSU based on entry of the vehicle into a coverage area of the other RSU; and
    receiving another RA message from the other RSU as a response to the other RS message.

5. The method of claim 4, wherein the other RA message includes another prefix of the other RSU.

6. The method of claim 5, wherein the vehicle performs a second address registration procedure based on the other prefix.

7. The method of claim 5, wherein the other RA message is generated based on entry of the vehicle into the coverage of the other RSU.

8. The method of claim 1, further comprising:
    transmitting another RS message to another RSU,
    receiving by the other RSU, from the RSU, the Proxy Binding Update (PBU) message to inform handoff of the vehicle, based on the RSU detecting that the vehicle is going to leave the coverage area of the RSU, and enter the coverage area of the other RSU; and
    receiving another RA message from the other RSU in response to the other RS message, based on the other RSU detecting that the vehicle is in the coverage area of the other RSU.

9. The method of claim 8, wherein the other RA message includes another prefix of the other RSU.

10. A vehicle performing a handoff in an IP-based vehicular network, the vehicle comprising:
    a transceiver configured to transmit/receive signals;
    a memory configured to store data; and
    a processor configured to:
        functionally control the transceiver and the memory;
        control the transceiver to
            transmit a router solicitation (RS) message to a road-side unit (RSU) to connect to the vehicular network, the RS message including mobility information of the vehicle, and
            receive a router advertisement (RA) message from the RSU in response to the transmission of the RS message, the first RA message including a prefix of the RSU for configuring an address of the vehicle; and
        perform a first address registration procedure based on the first prefix,
    wherein the RSU transmits to its mobility anchor (MA), a proxy binding update (PBU) message, which includes the mobility information of the vehicle,
    wherein the MA transmits a Proxy Binding Acknowledgement (PBA) message to the RSU in response to the PBU message,
    wherein the MA allocates a unique IP address to each of a plurality of vehicles in the IP-based vehicular network with a same prefix in its domain,
    wherein a Bi-Directional (Bi-Dir) Tunnel is generated between the RSU and the MA based on the PBU message, and
    wherein all traffic packets sent to the vehicle are encapsulated toward the RSU through the Bi-Dir Tunnel.

11. The vehicle of claim 10, wherein the mobility information of the vehicle is delivered to the mobility anchor (MA) of the vehicular network through the RSU.

12. The vehicle of claim 11, wherein the vehicle is de-registered from the RSU based on a report, by the RSU, to the MA that the vehicle is leaving of a coverage area of the RSU.

13. The vehicle of claim 12, wherein the processor is further configured to control the transceiver to:
    transmit another RS message to another RSU through the transceiver based on entry of the vehicle into a coverage area of the other RSU; and
    receive another RA message from the other RSU as a response to the other RS message.

14. The vehicle of claim 13, wherein the other RA message includes another prefix of the other RSU.

15. The vehicle of claim 14, wherein the processor is further configured to perform a second address registration procedure based on the other prefix.

16. The vehicle of claim 14, wherein the other RA message is generated based on entry of the vehicle into the coverage area of the other RSU.

17. The vehicle of claim 10, wherein the processor is further configured to control the transceiver to:
    transmit another RS message to another RSU, the other RSU receiving, from the RSU, the Proxy Binding Update (PBU) message to inform handoff of the vehicle, based on the RSU detecting that the vehicle is going to leave the coverage area of the RSU, and enter the coverage area of the other RSU; and receive another RA message from the other RSU in response to the other RS message, based on the other RSU detecting that the vehicle is in the coverage area of the other RSU.

18. The vehicle of claim 17, wherein the other RA message includes another prefix of the other RSU.

19. A method for managing vehicular mobility by a mobility anchor (MA) in an IP-based vehicular network, the method comprising:

receiving, by the MA, from a road-side unit (RSU), a proxy binding update (PBU) message including a Mobility Option including mobility information of a vehicle in a coverage area of the RSU;

transmitting, by the MA, a proxy binding acknowledgement (PBA) message to the RSU in response to the PBU message;

allocating, by the MA, a unique IP address to each of a plurality of vehicles in the IP-based vehicular network with a same prefix in its domain;

generating a bi-directional tunnel between the RSU and the MA based on the PBU message, wherein all traffic packets sent to the vehicle are encapsulated toward the RSU through the Bi-Dir Tunnel; and allocating, by the MA, unique IP addresses including a same prefix to one or more vehicles in the coverage area of the RSU.

20. The method of claim 19, further comprising:

receiving a de-registration message for the vehicle from the RSU;

transmitting, to another MA, another PBU message for notifying of entry of the vehicle into a coverage of another RSU in response to the de-registration message; and transmitting a response message to the RSU in response to the de-registration message, wherein the other RSU includes a prefix different from the prefix of the RSU.

* * * * *